(12) United States Patent
Cardenas-Granguillhome et al.

(10) Patent No.: US 6,409,927 B1
(45) Date of Patent: Jun. 25, 2002

(54) PROCESS FOR THE TREATMENT OF POLLUTED METAL-MECHANIC INDUSTRIAL WASTEWATER AND URBAN WATER

(76) Inventors: Enrique-Ruben Cardenas-Granguillhome; Juan-José Gonzalez-Garza, both of Lago Zumpamgo No. 6713, Esquina con Lago Zurich Colonia Lagos del Bosque, Monterrey, Nuevo León (MX)

( * ) Notice: Subject to any disclaimer, the term of this patent is extended or adjusted under 35 U.S.C. 154(b) by 0 days.

(21) Appl. No.: 09/612,691

(22) Filed: Jul. 10, 2000

Related U.S. Application Data

(63) Continuation-in-part of application No. 09/090,006, filed on Jun. 3, 1998, now abandoned.

(51) Int. Cl.⁷ .................................................. C02F 1/52
(52) U.S. Cl. ........................ 210/715; 210/717; 210/905; 210/919
(58) Field of Search ................................. 210/723, 724, 210/715, 717, 905, 919, 663, 665, 667

(56) References Cited

U.S. PATENT DOCUMENTS

| | | | | |
|---|---|---|---|---|
| 4,169,053 A | * | 9/1979 | Sakakibara et al. | |
| 4,419,247 A | * | 12/1983 | Tenny | 210/726 |
| 4,543,189 A | * | 9/1985 | Rice et al. | 210/713 |
| 4,802,991 A | * | 2/1989 | Miller | 204/273 |
| 6,251,277 B1 | * | 6/2001 | Van Der Spoel | 210/608 |

FOREIGN PATENT DOCUMENTS

| | | | |
|---|---|---|---|
| JP | 50-117256 | * | 9/1975 |
| JP | 53-65263 | * | 6/1978 |
| JP | 58-19498 | * | 2/1983 |
| JP | 59-26191 A | * | 2/1984 |
| JP | 2000301160 A | * | 10/2000 |
| SU | 372180 | * | 11/1969 |

* cited by examiner

*Primary Examiner*—David A. Simmons
*Assistant Examiner*—Frank M. Lawrence
(74) *Attorney, Agent, or Firm*—Abelman, Frayne & Schwab

(57) ABSTRACT

Process for the treatment of polluted metal-mechanic industrial waste water and urban water, comprising: treating the polluted water with an acid liquor including ferrous chloride and hydrochloric acid, in order to promote the denaturalization of protein present in metal-mechanic industrial water or urban water and generate a clarifying and purifying flocculus from said polluted water.

5 Claims, 1 Drawing Sheet

PROCESS FOR THE TREATMENT OF POLLUTED METAL-MECHANIC INDUSTRIAL WASTEWATER AND URBAN WATER

This application is a continuation-in-part of Ser. No. 09/090,006, filed Jun. 3, 1998, now abandoned.

BACKGROUND OF THE INVENTION

A. Field of the Invention

This invention is related with the treatment of polluted metal mechanic industrial wastewater and urban water and more specifically with a method for the treatment of waste water from industrial processes as well as the so called "black" water of the urban nets by adding ferrous chloride or acid liquors of the same, specifically with a spent pickling liquor containing ferrous chloride and hydrochloric acid, as resulting from industrial processes at the metal-mechanic industry.

B. Description of the Related Art

Mexican metallurgic industry, after privatization, has had a substantial increasing in production of steel and consequently of export products derived from the steel, such as the laminated steel, reaching 1.4 million tons of exports in 1996, and increasing the internal consumption of this product by a 34.5%.

However the industrial production of laminated steel, generates a great amount of industrial waste, among which is the spent pickling liquor containing ferrous salts and hydrochloric acid, which have been considered as a dangerous waste and consequently it has to be processed by the companies generating them or, as a last resource, said companies have to provide confinements for these dangerous residuals, controlled by the regulations, at a high cost that in turn strike directly in the production costs of the laminated steel. Some companies decompose this liquor by combustion, in order to recover hydrochloric acid and iron oxides. The hydrochloric acid is recycled to the pickling process and the iron oxides are marketed as pigments or for other uses.

The process for the decomposition of the pickling liquor is usually carried out by combustion in a furnace constructed with a refractory lining having a high content of silica, having a useful life of 5 to 7 years, so that the intensive consumption of energy required for the decomposition, joined to the considerable investment of the required equipment and the low price of the resulting acid and oxides, makes this process very expensive, and consequently the only justification of the same is just for ecological reasons.

However, such processes are not of the zero emission type since there are losses in the order of 2.3 to 31.75 kg. of hydrochloric acid per ton of processed pickling liquor.

As a consequence of these issues, Applicants conducted a deeply research about the properties of the pickling liquor, as starting point for their analysis, founding that the pickling liquor did not have the presence of heavy toxic metals such as: mercury, cadmium, selenium, chromium, lead, etc. and that its typical composition was: 220 g/l of ferrous salts; 15 g/l of hydrochloric acid, in approximately 940 ml. of water whose combination confers it very specific properties for the use in the treatment of industrial and urban water.

Applicants have found that contacting the waste water from the industrial processes as well as the polluted black water of the urban nets, with ferrous chloride or its acidic liquors, a clarifying flocculus of organic material is formed, derived from the precipitation of the ferrous ion, which adsorbs the organic matter (proteins, fatty, oil, carbohydrates, detergents) of this polluted water, by which it is possible to obtain water with a very low content of pollutants. Therefore, observing that the spent pickling liquor resulting from the processes of the metal-mechanic industry, mainly contains ferrous salts and hydrochloric acid, Applicants found that this spent pickling liquor can be used as the acidic liquor of the ferrous chloride in the direct physical-chemical treatment of the polluted water.

A method of removing soluble sulfide residue and organic compounds from industrial waste water is disclosed in the U.S. Pat. No. 4,419,247 of Tenny, which comprises the steps of adding to said scrubber water waste an acidic copper waste in an amount whereby the copper ion added is sufficient to precipitate no more than 90 percent of the sulfide ion present, removing the precipitated copper sulfide, and thereafter adding a pickle acid waste containing ferrous ions in an amount sufficient to essentially completely react with all sulfide present and to precipitate as an iron-copper sulfide mixture.

The objective of Tenny's method, is to treat only small amounts of scrubbed water waste produced by the process for the manufacturing polyolefins from natural gas, containing sulfide and cyanide, in order to produce a caustic water to be treated for recovering sodium hydroxide. Therefore Tennys's process necessarily comprise firstly adding an acidic copper waste and then adding a pickle acid waste containing ferrous ions to precipitate iron sulfide and ferrocyanide, as well as small amounts of oil.

In fact, the main reactive used in Tenny's method is the acidic copper waste and use a small amount of pickle acid waste just to complete the reaction with the sulfide and precipitate as an iron-copper sulfide. The, main objective of Tenny's method is to eliminate sulfide and cyanide by the precipitation of iron sulfide and ferrocyanide in order to produce a caustic water to be treated for recovering sodium hydroxide, whereas applicant's process main objective is to treat great amounts of metal-mechanic industrial waste water and urban water containing great amounts of oil, protein and organic material, in order to obtain great volumes of clean water which can be recycled even for human consumption which is not disclosed or even suggested by Tenny.

Furthermore, Tenny does not disclose nor remotely suggest the formation of a flocculus of organic material whereas applicant's process promotes the use of ferrous chloride for the formation of a flocculus of said organic material, by taking advantage of the so named "Z factor" in order to denaturalize the proteins contained in the waste water and promote the formation of said flocculus, which was not recognized nor remotely suggested by Tenny.

With applicants method, it is possible to obtain water with a very low content of pollutants—even for human consume—allowing at the same time a re-use of the spent pickling liquor whose final destination, at the present time, is the confinement and/or the decomposition, with polluting consequences for the environment.

SUMMARY OF THE INVENTION

It is therefore a main objective of the present invention, to provide a process for the treatment of polluted metal-mechanic industrial waste water and urban water, by adding ferrous chloride or their acidic liquors, in order to form a clarifying flocculus of organic material derived from the precipitation of the ferrous ion that adsorbs the organic matter such as the proteins, fatty, oil, carbohydrates and detergents, contained in this polluted water.

It is also a main objective of the present invention, to provide a process for the treatment of polluted metal-mechanic industrial waste water and urban water, of the above disclosed nature, by using the spent pickling liquor resulting from the processes of the metal-mechanic industry mainly containing ferrous salts, hydrochloric acid and water mainly, as the acidic liquor of the ferrous chloride.

It is an additional objective of the present invention, to provide a process for the treatment of polluted metal-mechanic industrial waste water and urban water, of the above disclosed nature, which avoids the necessity of confining and/or decomposition of the spent pickling liquor resulting from the metal-mechanic industry having polluting consequences for the environment.

It is still an additional objective of the present invention, to provide a process for the treatment of polluted metal-mechanic industrial waste water and urban water, of the above disclosed nature, which avoids the enormous costs derived of the process of decomposition and/or confinement of such spent pickling liquor.

These and other objectives and advantages of the present invention, will be apparent to the persons having ordinary skills in the art, from the teachings of the following description of the specific embodiments of the invention, represented by the following examples for carrying out this process.

DETAILED DESCRIPTION OF THE INVENTION

Figure 1:
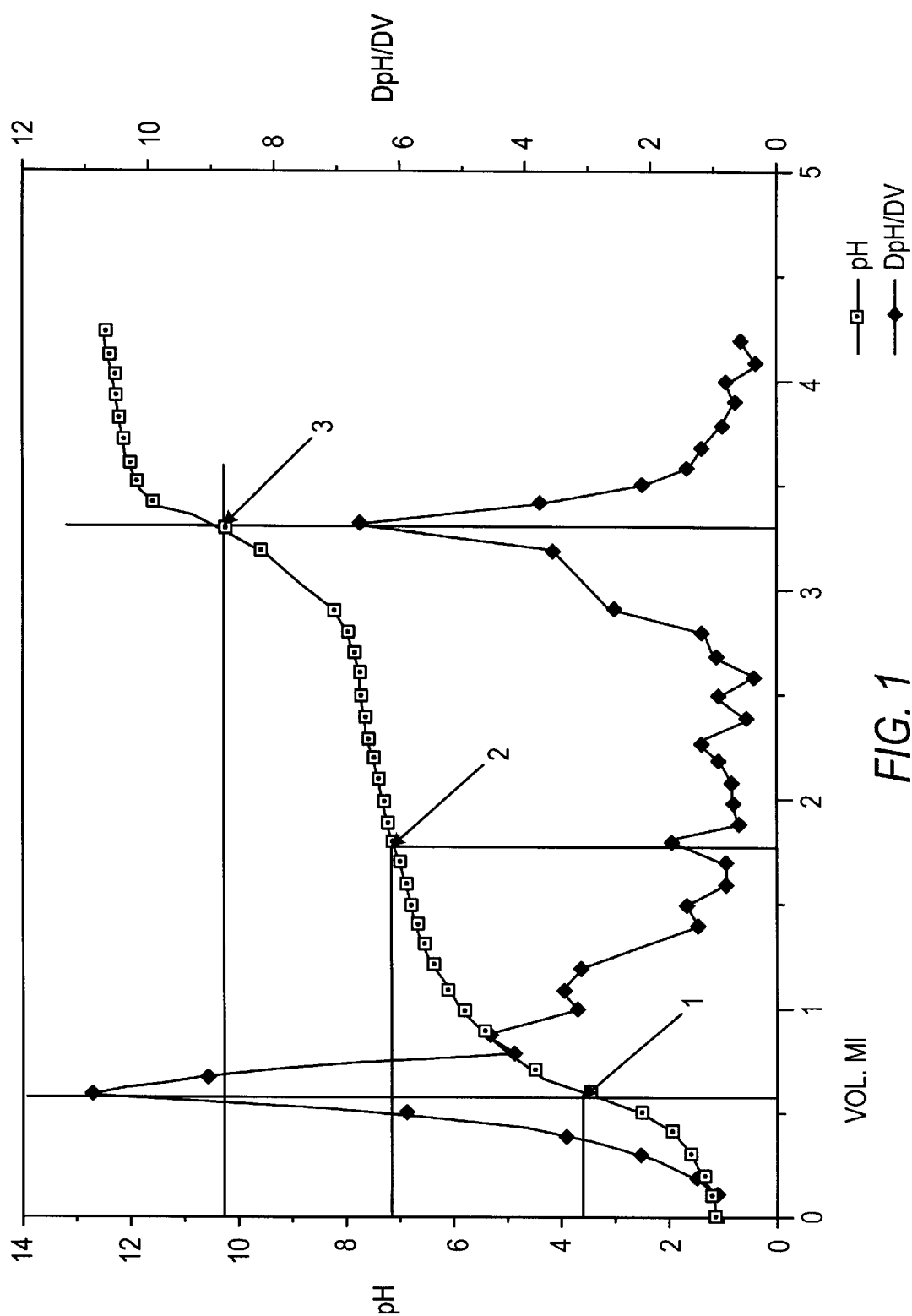
FIG. 1 is a graphic of the potentiometric titling of the spent pickling liquor showing the diverse points of neutralization of the pickling hydrochloric free acid and of the chloride ion.

In the industrial environment, there is a great variety of residual water types which, if they are not treated, generate environmental contamination, and for such a reason, in the following a general process for the treatment of industrial and urban water, by using the spent pickling liquor, will be firstly described, and next, some processes for the treatment of specific cases of diverse residual polluted water, by means of specific examples, will also be illustrated:

The general process for the treatment of polluted industrial and urban water of the present invention, comprising:

1—Determining the pH of the influent (polluted water), at the input line of a regulating tank, in order to calculate the dosage of the ferrous chloride or of the acidic liquor (spent pickling liquor), to be added, usually an amount of 400 to 2000 g. of ferrous chloride, preferably hexahydrated, per cubic meter of water to be treated or else 1 to 5 lt. of pickling liquor per cubic meter of influent, and more preferably 2 liters of liquor per cubic meter of influent;

2—Determining the pH of the effluent (water in treatment) at the output line of the regulating tank and adjust it with lime slurry at 7% weight/volume, to a range of 5.5 to 9.5, preferably of 8.5, and discharging the effluent at a settling tank, through its lower end;

3—Settling the treated effluent, in the settling tank during a residing time of 40 to 120 minutes according to the flow of the effluent which is being treated, preferably 60 minutes, so as to precipitate solids and forming a flocculus until the hydrodynamic analysis shows a laminar flow on the flocculus;

4—Passing the effluent with the precipitate, to a flocculing tank preferably with a cylindrical-conical geometry wherein a filtering precipitate bed is formed at the conical lower end of the flocculing tank, through which the effluent flow is passed in order to retain the precipitate in the filtering bed. The effluent of this tank, obtained at the upper end of the tank, must comply with the corresponding norm, as totally clarified.

5—Constantly maintaining the level of precipitate into the flocculating tank, by programmed purges and appropriate controls, these purges will pass to a thickener tank for a letter filtration. The filtered liquid will be recycled to the regulating tank. The precipitate will be discarded according to the regulations.

As it was previously mentioned, the treating processes of the diverse types of water will be presented at the following examples of treatment with spent pickling liquor, which is one of the most economic and available sources.

EXAMPLES

Example 1

Water from a process of the metal-mechanic industry (laminated, colored, galvanized and another steel.)
Process
The dosage is by cubic meter of industrial processed water.
1. Determining the pH to 10.68.
2. Adding 2 liters of spent pickling liquor, to a pH of 5.3.
3. Adding a lime slurry, in order to adjust the pH to 8.5.
The following comparative table shows the analysis of the product and of the influent.
Physicochemical Analysis of the Following Effluents

| Parameter | Product | Influent |
| --- | --- | --- |
| pH | 8.27 | 10.1 |
| Total alkalinity | 120.0 | 4750.0 |
| CaCO3 alkalinity | 0.0 | 3750.0 |
| Bi CaCO3 alkalinity | 120.0 | 0.0 |
| Hydroxyl alkalinity | 0.0 | 1360.0 |
| Temporal hardness | 237.0 | 120.0 |
| Permanent hardness | 1051.0 | 110.0 |
| Total hardness | 237.0 | 120.0 |
| Calcium hardness | 232.0 | 120.0 |
| Magnesium hardness | 4.0 | 0.0 |
| Total solids dissolved | 1012.0 | 6000.0 |
| Conductivity ((Mhos) | 2600.0 | 9000.0 |
| Fatty and oil | 23.0 | 6500.0 |
| Calcium | 93.0 | 60.0 |
| Magnesium | 5.5 | 0.0 |
| Sodium | 573.0 | 2991.0 |
| Chloride | 836.0 | 600.0 |
| Sulfate | 94.0 | 1360.0 |
| Iron | 0.05 | 0.60 |
| Silica | 5.0 | 58.0 |
| Heavy metal analysis | | |
| Chrome Cr | 0.00 | 0.60 |
| Copper Cu | 0.00 | 0.03 |
| Nickel Ni | 0.10 | 0.55 |
| Manganese Mn | 0.65 | 1.55 |
| Lead Pb | 0.00 | 1.60 |
| Zinc Zn | 0.15 | 2.08 |
| Cadmium Cd | 0.00 | 0.00 |
| Aluminum Al | 0.08 | 1.00 |

The influent is polluted water that arrives in order to be treated and the product is the water already treated.

Example 2

Textile Waters from the Dye Process of Light Cloth Fabric, (Indigo Blue)

Process

The dosage is by cubic meter of residual industrial water.
1. Determining the pH of the residual water, to 9.98.
2. Adding 5 liters of spent pickling liquor.
3. Determining the final pH to 4.0.
4. Adding lime slurry up to a final pH of 7.3.

Results

After decanting the precipitate, the water product is free of color and looks colorless to the human eye.

Determining the absorbency

| Water before the treatment | 100% |
| Water after the treatment | 9% |

Example 3

Emulsified oil from cutting machines.
Treated volume: 1 cubic meter with a pH of 10.04.
Spent pickling liquor: 25 liters with a pH of 4.58, with agitation.
Resting Time: 60 minutes.
Separating oily creams: 100 liters.
Opaque solution: 900 liters.
Adding lime slurry: 100 liters with a pH of pH 7.54.
Filtering through the flocculus.

Results

| Variable. | Creams. | Product water. |
| --- | --- | --- |
| Color | 5.57 | 7.54 |
| Conductivity | N.D. | 47.00 |
| Total of suspended solids | 12940.00 | 55.70 |
| Suspended solids | 0.0 | 6.00 |
| Fatty and oil | 32506.23 | 3.00 |
| DQO | 1,648000.00 | 6570.00 |
| DBO | 97558.70 | 2097.98 |

Independently of the theoretical basis of the clarification mechanism contributed by the formation of the flocculus, the procedure of the present invention has given previously disclosed the results.

Nevertheless, with the exclusive purpose of disclosing the mechanism of clarification or purification of the polluted waters, by means of the addition of spent pickling liquor, according with the present invention, the theoretical basis of the formation of the flocculus (cationic polymer) and its clarifying effect will be discussed:

The reaction between the polluted water and the spent pickling liquor can be illustrated with $Fe(H_2O)_4^{2+}$ when reacts with a hydroxide ion and immediately is condensed:

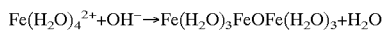

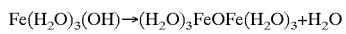

The dimer and other polymers which are formed, intervene in a big amount of balances illustrated by the dissociation reactions, as:

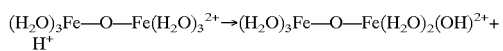

and

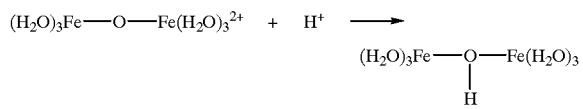

A later neutralization of the dimer by elimination of protons of the hydration water molecules leads to the condensation reactions in order to form trimers, tetramers, etc. When the polymer becomes very long and the positive charge becomes very diffuse, the moisturized ferrous oxide could be precipitated, $FeO \times H_2O$.

Generally if an alkaline hydroxide is added to a solution of metallic cations, the hydroxide precipitate is not pure, because it is polluted by anions as a result of basic salts or by absorption of anions and it is not equivalent to a pure hydroxide, which is beneficial for the treatment process of residual water, since there is a great tendency to the co-precipitation.

The sulfates are precipitated in a greater amount than the chlorides, and the chlorides are precipitated in a greater amount than the nitrates or the perchlorate (Gilchrist 1943).

According to the theory of the coordination by Alfred Werner, professor of Chemistry of the University of Zurich, in the elements that form the complexes, the index of coordination of a central element of the same, is their primary valence multiplied by two, so: in the $Co^{3+}$ ion, the number of bonds admitted, in the $Fe^{3+}$ are six and, in the $Fe^{2+}$ are four.

The spatial distribution of the bond (molecules tied with a coordinate covalence to the central atom), according to the theory of the chemical bond and the hybridization of the atomic and molecular orbits, in the coordination compounds with and index of four, the atomic hybridization of the central cation, in this case the $Fe^{2+}$, it is $dsp^2$, that geometrically corresponds to a square plane with a bond placed at each vertex of the same, as shown in the following figure:

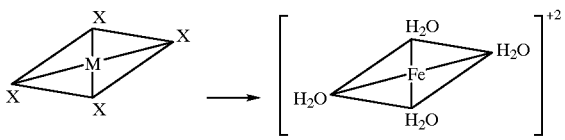

Due to the geometry of the four bonds, the metallic ion is exposed to the attack of additional groups above and under the plane of the bonds.

This situation is shown practically by the work of the ferrous ion flocculus when it is contacted with the municipal residual water and the water of industrial processes, and it is the basis of the absorption of organic matter (proteins, fatty, oil, carbohydrates, detergents), that are absorbed by the flocculus, which is manifested by the lowering of the DQO and the clarification of the tried waters.

The theoretical effectiveness compared with the $Fe^{+3}$, is based on the fact that the $Fe^{+3}$ has the hybridization $d^2sp^3$ that is equal to a geometry of a central atom surrounded by six bonds, equidistantly distributed in the space forming two tetrahedrons linked by their basis.

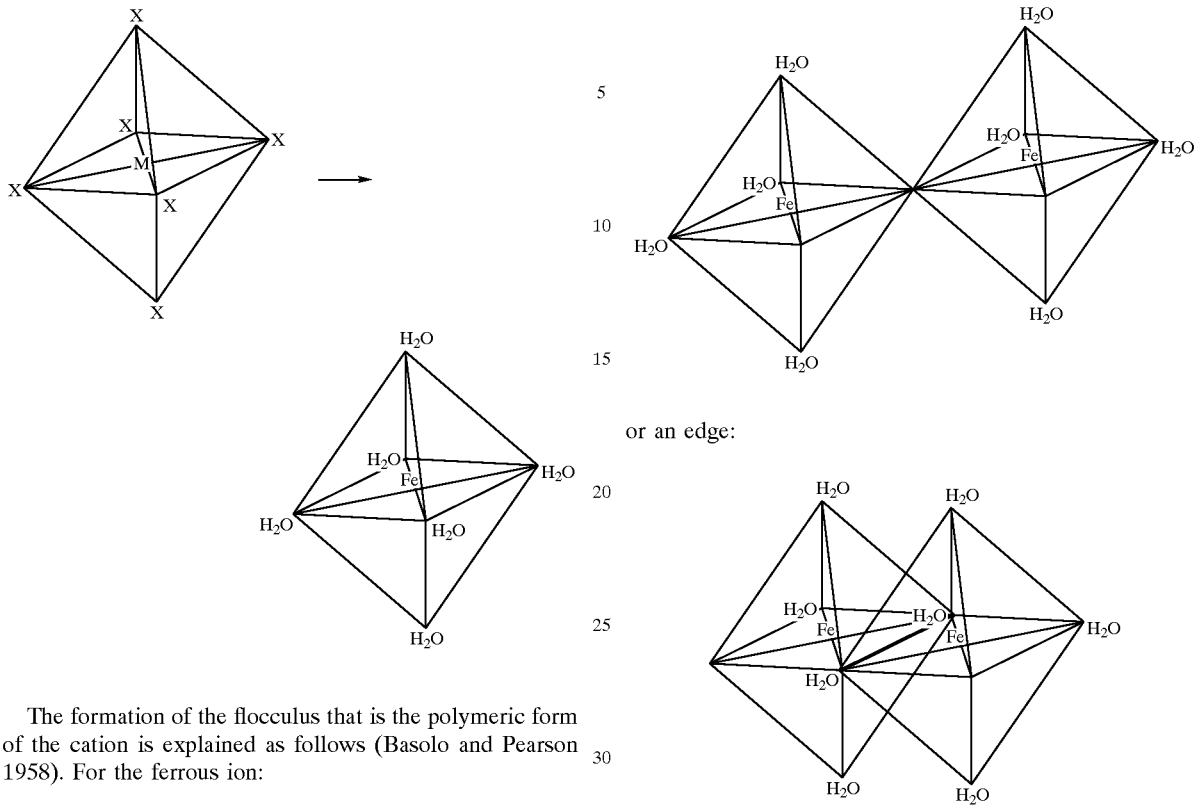

The formation of the flocculus that is the polymeric form of the cation is explained as follows (Basolo and Pearson 1958). For the ferrous ion:

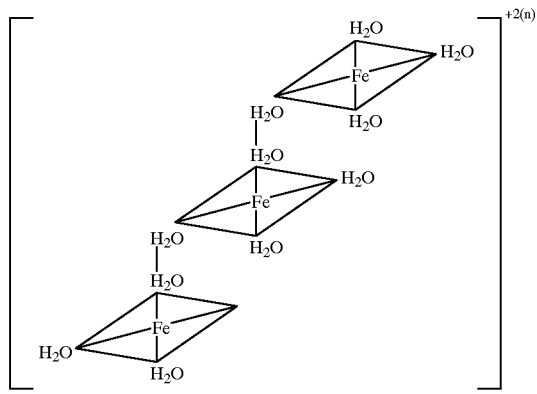

By means of crystallographic analysis it has been determined that this complex crystallizes with bonds of neighboring units on and under the central nucleus of coordination (Basolo and Pearson 1958).

The bonding lengths between an iron atom and the molecules of water (bonds), of the neighboring units, are a little longer than the square plane union distances of the coordination geometry, as a consequence of the molecular hybridization of the bond.

Undoubtedly, the complex is solvated on and under the plane, in such a way that the bonding of the central metal of the complex, with the molecule of water of the neighboring complex, is only of attraction, due to a dielectric constant that it is shown by the pH of the solution (the optimum pH is in the range of 8.5 to 9.5).

The great difference in the behavior of the $Fe^{3+}$ ion is its index of coordination of six, and its geometry, since the polymerized octahedrons can be linked by a vertex:

or an edge:

The solvating occurs, but in a more slowly way, due to the natural esteric impediment of the water molecules that are on the central coordination atom and the union force with the flocculus that is weaker and therefore less effective.

Another theoretical advantage of the ferrous ion flocculus against the ferric ion flocculus is that the ferrous polymer, according to its coordination index, will always be surrounded by four molecules of water, against six of the ferric ion; this is shown by the speed of decanting, since the ferrous ion flocculus density is 17% heavier than that of the ferric ion.

Last but not least, the theoretical basis of the amounts of liquor that are necessary in order to clarify the diverse types of water, as well as the stages of adjustment of the pH, of the process, is the result of a potentiometric titration of the spent pickling liquor.

As it is illustrated in the Graphic of Potentiometric Titration of the spent pickling liquor, which is shown in FIG. 1, on potentiometrically tittering the spent pickling liquor with a sodium hydroxide solution 1N, a graphic of neutralization is obtained where the following points are observed:

a) a point 1 of equivalence to a pH of 3.6 indicating the neutralization of the pickling free hydrochloric acid, equivalent to 15 g/l;

b) a point 2 of equivalence that indicating the first neutralization of the chloride ion to a pH of 7.25, forming a compound of basic II iron chloride;

c) a point 3 of equivalence indicating the total neutralization of the II iron chloride to a pH of 10.25, forming a II iron hydroxide.

Finally it must be understood that the present invention, is not limited exclusively to the examples above described and that the persons having ordinary skill in the art can, will be able, through the teaching provided by this invention, to make qualitative and quantitative changes in the steps and components of the process of the present invention, which will clearly be within of the true inventive concept and of the scope of the invention which is claimed in the following claims:

We claim:

1. Process for the treatment of polluted metal-mechanical industrial waste water and urban water, comprising: treating the polluted water with about 400 to about 2000 grams of acid liquor, including ferrous chloride and hydrochloric acid, per cubic meter of polluted water, to form a clarifying flocculus resulting from the precipitation of the ferrous ion which adsorbs protein present in the metal-mechanical industrial waste water or urban water.

2. The process as claimed in claim 1, wherein the ferrous chloride is hexahydrated ferrous chloride.

3. The process as claimed in claim 1, wherein the acid liquor is a spent pickling liquor containing ferrous chloride and hydrochloric acid, derived from metal-mechanic industry processes.

4. The process as claimed in claim 1, wherein the acid liquor is a spent pickling liquor comprising from about 1 to about 220 g/l of ferrous chloride, at least about 10 g/l of hydrochloric acid and the remainder comprising water.

5. The process as claimed in claim 1, wherein the purifying flocculus is formed from organic material.

* * * * *